United States Patent
Kasahara et al.

(10) Patent No.: US 8,307,458 B2
(45) Date of Patent: Nov. 6, 2012

(54) CONTENT DATA DELIVERY SYSTEM, AND METHOD FOR DELIVERING AN ENCRYPTED CONTENT DATA

(75) Inventors: Akihiro Kasahara, Oamishirasato-machi (JP); Akira Miura, Kanagawa (JP); Hiroshi Suu, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 933 days.

(21) Appl. No.: 11/505,820

(22) Filed: Aug. 18, 2006

(65) Prior Publication Data

US 2007/0043769 A1  Feb. 22, 2007

(30) Foreign Application Priority Data

Aug. 18, 2005  (JP) ................ 2005-237259

(51) Int. Cl.
G06F 7/04  (2006.01)
(52) U.S. Cl. .................. 726/30; 713/193; 380/201
(58) Field of Classification Search ............. 726/30
See application file for complete search history.

(56) References Cited

U.S. PATENT DOCUMENTS

| | | | | |
|---|---|---|---|---|
| 6,636,966 B1 * | 10/2003 | Lee et al. | .......... | 713/165 |
| 6,732,106 B2 * | 5/2004 | Okamoto et al. | .......... | 707/100 |
| 2003/0009681 A1 * | 1/2003 | Harada et al. | .......... | 713/193 |
| 2003/0085289 A1 * | 5/2003 | Kaneko | .......... | 235/492 |

FOREIGN PATENT DOCUMENTS

| | | |
|---|---|---|
| JP | 2001-331663 | 11/2001 |
| JP | 2003-78517 | 3/2003 |
| JP | 2004-521414 | 7/2004 |
| JP | 2004-350150 | 12/2004 |
| JP | 2005-11105 | 1/2005 |
| WO | WO 02/056203 A1 | 7/2002 |

OTHER PUBLICATIONS

Office Action issued Jan. 25, 2011, in Japan Patent Application No. 2005-237259 (with English translation).
Japanese Office Action issued on Apr. 19, 2011 in corresponding Japanese Application No. 2005-237259 (with an English Translation).

* cited by examiner

Primary Examiner — Shewaye Gelagay
(74) Attorney, Agent, or Firm — Oblon, Spivak, McClelland, Maier & Neustadt, L.L.P.

(57) ABSTRACT

A handheld device is configured to be connectable to a storage media that holds a unique media identifier and holds a content key data used to decrypt an encrypted content data. A content data delivery system is provided that is configured to be able to deliver various data to the handheld device and to make a content data available to the handheld device. The system includes a member-registration information database that holds member-registration information including a data pair of a handheld-device identifier related to the relevant handheld device and the relevant media identifier. The media identifier held by the storage media is verified with the member-registration information database. When it is determined that the media identifier corresponds to the member-registration information, the content key data held in the storage media is read, and it is determined whether an encrypted content data corresponding to the read content key data is stored in the storage media or other storage media coupled to the storage media. The encrypted content data is transferred to the storage media or the like depending on the user's specification.

4 Claims, 7 Drawing Sheets

MEMBER-REGISTRATION INFORMATION DB41

| MEMBER No. | HANDHELD-DEVICE IDENTIFIER IDc | MEDIA IDENTIFIER IDm |
|---|---|---|
| 001 | DC001 | XY001, YZ002 |
| 002 | KD001 | EF003 |
| ⋮ | ⋮ | ⋮ |
| 00n | TK002 | GH004 |

FIG. 4

MEMBER CONTENT KEY DB47

| MEMBER No. | HANDHELD -DEVICE IDENTIFIER IDc | MEDIA IDENTIFIER IDm | HELD CONTENT KEY DATA BUNCH |
|---|---|---|---|
| 001 | DC001 | XY001 | Kc1, Kc5, Kc7 |
|  |  | ,YZ002 | Kc2, Kc4 |
| 002 | KD001 | EF003 | Kc1, Kc2 ⋯ Kcn |
| ⋮ | ⋮ | ⋮ | ⋮ |
| 00n | TK002 | GH004 | Kc6, Kc8 ⋯ Kck |

CONTENT DATA DELIVERY SYSTEM, AND METHOD FOR DELIVERING AN ENCRYPTED CONTENT DATA

CROSS REFERENCE TO RELATED APPLICATIONS

This application is based on and claims the benefit of priority from prior Japanese Patent Application No. 2005-237259, filed on Aug. 18, 2005, the entire content of which are incorporated herein by reference.

BACKGROUND OF THE INVENTION

1. Field of the Invention

The present invention relates to a content data delivery system and a method for delivering an encrypted content data, more particularly, to a content data delivery system and a method that delivers a content data to a storage media connected to a handheld device such as a mobile phone.

2. Description of the Related Art

With the recent development of the information society, a content delivery system has become commonly used that delivers to a user terminal a content such as an electronic book, a newspaper, music, a motion picture or the like and makes the content available to the user (see, for example, Japanese application patent laid-open publication No. 2004-350150). The user may use the personal computer connectable to the Internet to access the Internet website for content delivery, and download a content at a cost or at no cost. The personal computer used for the download may itself play the downloaded content data. It is also becoming common to copy the downloaded content data to a handheld device such as a mobile phone terminal or a portable music player and to play the data.

Even when playing the high-quality music on the mobile phone terminal, the current content delivery system cannot download the content data directly to the mobile phone terminal, and instead needs to acquire the content data via the personal computer. It is convenient for the user having no personal computer but only a mobile phone terminal to be able to use the content delivery system only via the mobile phone terminal without using the personal computer. The content delivery provider may also have advantages that more users will use the delivery system and more business opportunities will be created.

Using the content delivery system only via the mobile phone terminal has problems with lower communication speed of the mobile phone network and with more difficult management of the purchased content data. In other words, using the content delivery system via the personal computer may easily manage a large amount of content data using content data management software or the like on the computer. For example, the personal computer may hold and manage a large amount of content data by organizing the data per category, artist, or the like. From the library thus organized, a favorite content data may be transferred to and used on the handheld device of a small storage capacity as appropriate. When the user becomes bored with the transferred content data, the user may copy another favorite content data from the library and play it.

Receiving the content data delivery only via the mobile phone terminal has a problem that it is difficult to appropriately hold and manage a large amount of content data because of the insufficient capacity of the SD memory card used as the storage media and because of the small screen of the display in the handheld device or the like. For a data that has been dissipated or deleted, the relevant content data needs to be purchased again, thereby providing disadvantage and poor economy to the user.

SUMMARY OF THE INVENTION

According to an aspect of this invention, there is provided a content data delivery system configured to be able to deliver various data to a handheld device and to make a content data available to above-described handheld device, above-described handheld device being configured to be connectable to a storage media that holds a unique media identifier and holds a content key data used to decrypt an encrypted content data, above-described content data delivery system comprising: a member-registration information database that holds member-registration information including a data pair of a handheld-device identifier related to above-described handheld device and above-described media identifier; a verification portion that reads above-described media identifier held by storage media and verifies above-described media identifier with above-described member-registration information database; a storage condition determination portion that, when above-described verification portion determines that above-described media identifier corresponds to above-described member-registration information, reads above-described content key data held in storage media, and determines whether an encrypted content data corresponding to read content key data is stored in above-described storage media or other storage media coupled to above-described storage media; a display portion that displays a determination result of above-described storage condition determination portion; and a transfer portion that transfers above-described encrypted content data to above-described storage media or above-described other storage media depending on user's specification of above-described storage media.

According to an aspect of this invention, there is provided a method for delivering an encrypted content data to a handheld device, said handheld device being configured to be connectable to a storage media that hold a media identifier unique to the storage media and a content key data used to decrypt the encrypted content data, said method comprising the following:

storing in a database member-registration information including a data pair of a handheld-device identifier related to the handheld device and the media identifier;

verifying that the media identifier is stored in the database after reading the media identifier of the storage media;

determining whether an encrypted content data corresponding to the content key data is stored in the storage media or other storage media, when the media identifier is verified that it is stored in the database; and transferring the encrypted content data corresponding to the content key data to the storage media or the other storage media, when the storage media or other storage media do not contain the encrypted content data.

BRIEF DESCRIPTION OF THE DRAWINGS

FIG. 4 shows an example of a data stored in a member content-key database 47.

DETAILED DESCRIPTION OF THE EMBODIMENTS

With reference to the accompanying drawings, a description is given below of the embodiments of the present invention.

Figure 1:
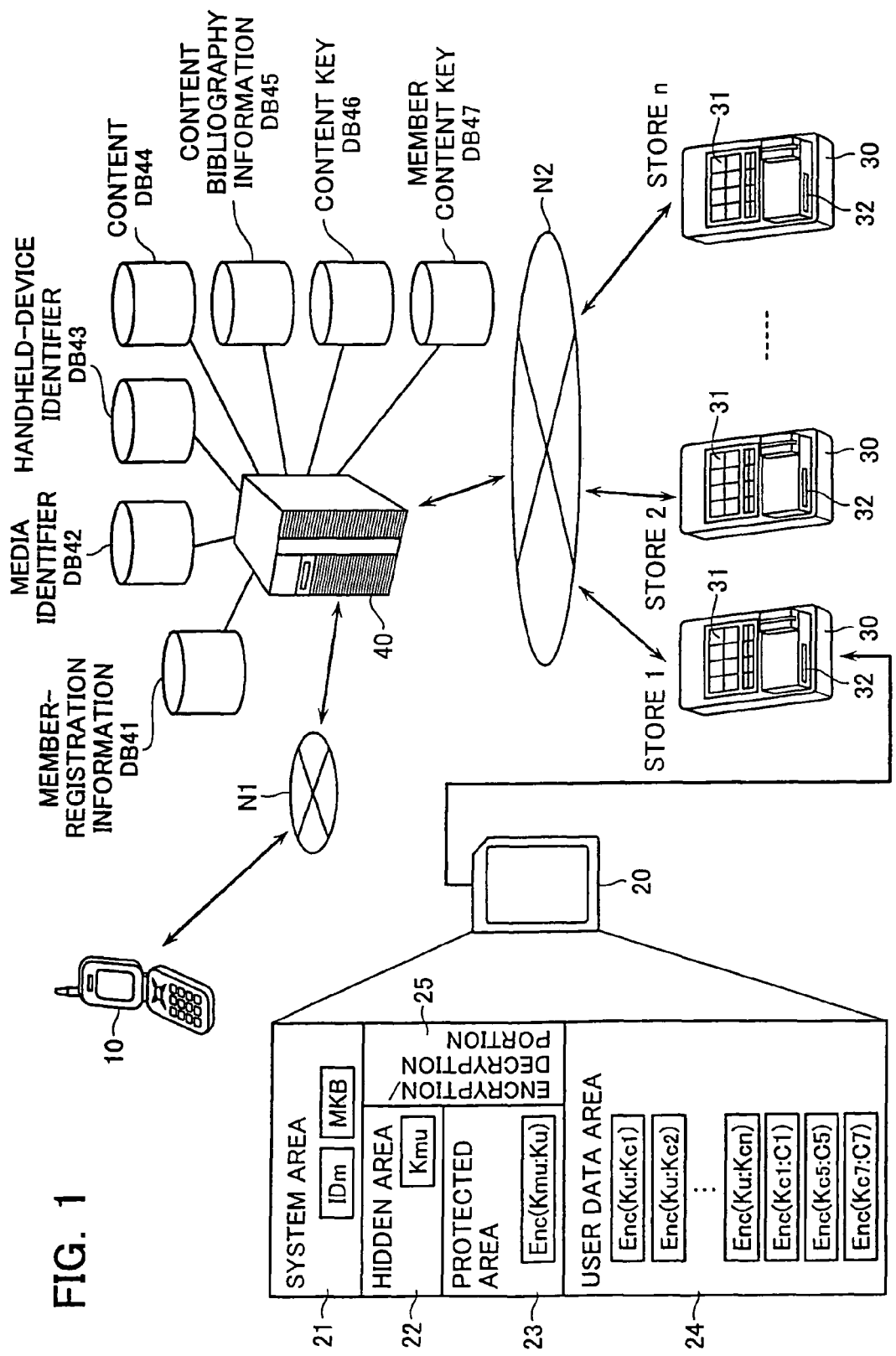
FIG. 1 is a schematic diagram of the configuration of a content data delivery system of a first embodiment of the present invention.

FIG. 1 is a schematic diagram of the entire configuration of a content data delivery system of the present embodiment. The user carries a handheld device 10 such as a mobile phone terminal, and an SD memory card 20 that is a storage media connectable to the handheld device 10. A store (or shop) terminal 30 and a server 40 are provided as a system that delivers a content data C and a content key data Kc to the handheld device 10 and SD memory card 20.

The SD memory card 20 is an example of the secure storage media that securely stores the data. The SD memory card 20 includes a system area 21, a hidden area 22, a protected area 23, a user data area 24, and an encryption/decryption portion 25. Each of the areas 21 to 24 stores a data. Specifically, the SD memory card 20 stores, in a system area 21, key management information media key block (MKB) and a media identifier IDm. The hidden area 22 stores a media-specific key data Kmu. The protected area 23 stores an encrypted user key data Enc (Kmu: Ku). The user data area 24 stores a content key data Enc (Ku: Kci) encrypted with the user key Ku and a content data Ci (Enc (Kci: Ci)) encrypted with the content key data Kci. Note that the Enc (A: B) means herein a data B encrypted with a data A. The user key Ku is the encryption/decryption key for the content key Kci. The user key Ku is used in common for a plurality of encrypted content keys Enc (Ku, Kc1), Enc (Ku, Kc2) . . . in the same SD memory card 20.

The system area 21 is read-only and accessible from the outside of the SD memory card 20. The hidden area 22 is also read-only and is an area to which the SD memory card 20 itself refers. The hidden area 22 is never accessible from the outside of the SD memory card 20. The protected area 23 may be read/written from the outside of the SD memory card 20 if the user is successfully authenticated. The user data area 24 may be freely read/written from the outside of the SD memory card 20. It is supposed in this embodiment that the user data area 24 of the SD memory card 20 also stores the encrypted content data Enc (Kc: C) along with the content key data Kc. Another storage media other than the SD memory card 20 may also store the encrypted content data. The encryption/decryption portion 25 performs the authentication, key exchange, and cipher communication between the protected area 23 and the outside of the SD memory card 20. The encryption/decryption portion 25 has a function of encryption/decryption.

For such a SD memory card 20, the handheld device 10 operates as follows. The handheld device 10 performs, using a preset device key Kd, an MKB process on the key management information MKB read from the system area 21 of the SD memory card 20, thereby obtaining a media key Km. The handheld device 10 then performs a hash process both on the media key Km and on the media identifier IDm read from the system area 21 of the SD memory card 20, thereby obtaining a media-specific key Kmu.

The handheld device 10 then uses the media-specific key Kmu as a basis to perform the authentication and key exchange (AKE) process with the encryption/decryption portion 25 of the SD memory card 20, thereby sharing a session key Ks with the SD memory card 20. Note that the authentication and key exchange process are successful and the session key Ks is shared when the media-specific key Kmu in the hidden area 22 that is referred to by the encryption/decryption portion 25 coincides with the media-specific key Kmu generated in the handheld device 10.

The handheld device 10 then reads the encrypted user key Enc (Kmu, Ku) from the protected area 23 via the cipher communication using the session key Ks. The handheld device 10 then decrypts the encrypted user key Enc (Kmu, Ku) with the media-specific key Kmu, thereby obtaining the user key Ku. The handheld device 10 finally reads the encrypted content key Enc (Ku, Kc) from the user data area 24 of the SD memory card 20. The handheld device 10 then decrypts the encrypted content key Enc (Ku, Kc) with the user key Ku, thereby obtaining the content key Kc. The handheld device 10 finally reads the encrypted content Enc (Kc, C) from the SD memory card 20. The handheld device 10 then decrypts the encrypted content Enc (Kc, C) with the content key Kc and plays the resulting content C.

The double-key encryption scheme provides the SD memory card 20 with the unique media identifier IDm and provides each media identifier IDm with the specific user key Ku. The user key Ku is also encrypted and stored in the protected area 23 of the SD memory card 20. The user key Ku may be encrypted depending on the media identifier IDm. A valid player may only decrypt the user key Ku. An intruder that illegally copies only the content key Kc from the user data area 24 may thus not acquire the content.

From the content delivery provider, the user purchases the content key data Kc and acquires the encrypted content data Enc (Kc: C) in various ways. The encrypted content data Enc (Kc: C) may be decrypted with the content key data Kc. The content key data Kc itself has a small data amount. The handheld device 10 may thus receive the content key data Kc through data communication via the narrow band network N1 (such as the mobile phone network) between the handheld device 10 and server 40. After receiving the content key data Kc, the handheld device 10 encrypts it with the user key Ku and stores it in the user data area 24 of the SD memory card 20. The content data C usually has a data amount of a few Megabytes or more. It is thus difficult for the handheld device 10 to transmit or receive the content data C in the narrow band environment. In this embodiment, therefore, the handheld device 10 receives the content data C via the store terminal 30. The user thus receives various data from the store terminal 30. The store terminal 30 in turn receives various data from the server 40 via the network N2 that is the broadband network.

The store terminal 30 is provided, for example, at a convenience store, a gas station, a bookstore or the like across the country. The store terminal 30 is an online terminal for services such as the sale and payment of various tickets or the like. The store terminal 30 includes a display portion 31 such as the touch panel display, and a slot 32 into which the SD memory card 20 is inserted after being removed from the handheld device 10. In parallel with or instead of the slot 32, an end terminal or the like may be provided to which the handheld device 10 itself is connected via the USB cable or the like. Note that the network N2 may include a variety of networks other than the Internet, such as an intranet, an extranet, a leased line, or a virtual private network (VPN).

In the content data delivery system of this embodiment, after the user is registered as a member, the store terminal 30 and server 40 provide a management service for the content data about the content key data Kc that user has already purchased and stored in the SD memory card 20. Specifically, the display portion 31 of the store terminal 30 provides information about, among all content key data Kc already purchased, whose corresponding content data is also already stored in the SD memory card 20 or in other storage media coupled to the SD memory card 20. The user may refer to the information described above to understand the content data that is currently playable in the user's own handheld device 10 and the content data that the user may use again without payment by redownloading it or the like. Note that it is supposed that the member registration is performed by providing the handheld-device identifier IDc and media identifier IDm in various ways. The handheld-device identifier IDc acts as the identifier about the handheld device. The various ways include, for example, by user's accessing the server 40 from the handheld device 10 via the mobile phone network, by using the store terminal 30, and by mail. The handheld-device identifier IDc may be an identifier that identifies the handheld device 10 itself, or an identifier that identifies the user of the handheld device 10.

In the content data delivery system of this embodiment, after the user is registered as a member, the store terminal 30 and server 40 provide a service where the user may have an unlimited number of downloads at no charge (except the monthly membership fee after the member registration) of the content data whose content key data is already purchased by the user. Note that the content data that the user newly purchases, in other words, the content data whose content key data has not been purchased by the user may be acquired along with the content key data by making a predetermined payment by cash payment at the store or by using various online and offline ways (such as the credit card, prepaid card, addition to the mobile phone bill). Another service may also be provided where the user may download only the encrypted content data before purchasing the content key data. Subsequently purchasing the content key data may play the encrypted content data. Note that in the service described above, the user may preferably have a limited number of downloads of the encrypted content data before purchasing the content key data in order to prevent the abuse and copyright infringement or the like due to the illegal decryption of the encrypted content data or the like.

In the content data delivery system of this embodiment, after the user is registered as a member, the store terminal 30 and server 40 provide a service that may store and manage the content key data that is already purchased by the user, and that may allow the user to redownload an accidentally deleted content key data.

Figures 2, 3:
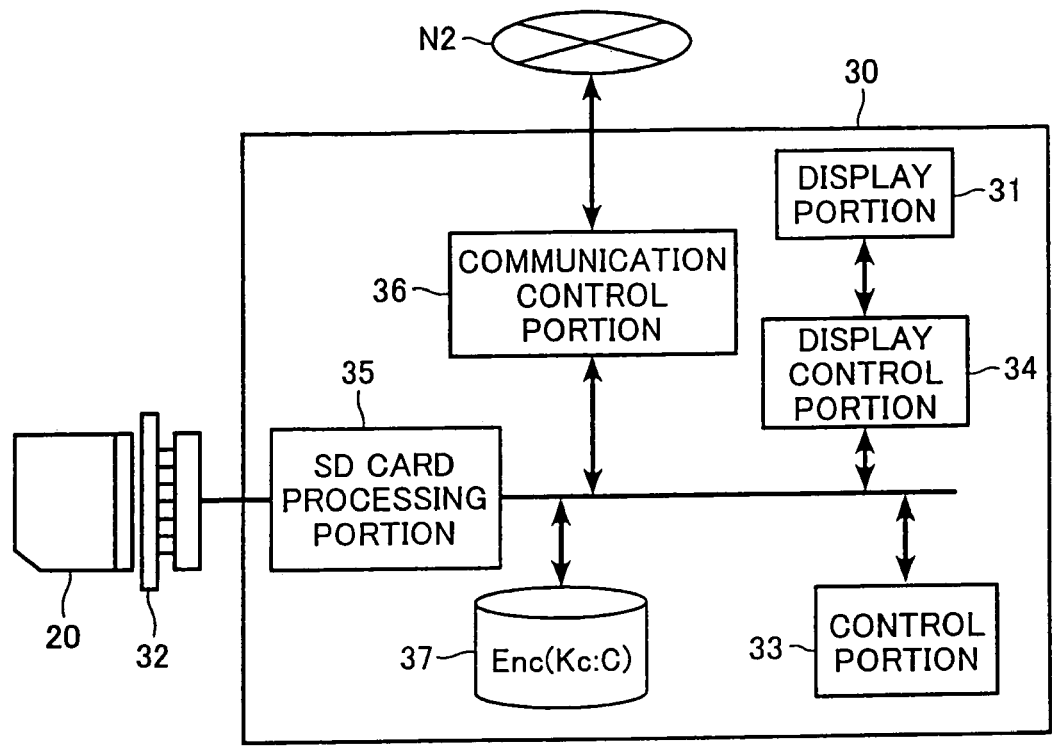
FIG. 2 is a block diagram of the internal configuration of the store terminal 30 in FIG. 1.
FIG. 3 shows an example of a data stored in a member-registration information database 41.

FIG. 2 is a block diagram of the internal configuration of the store terminal 30. The store terminal 30 includes a control portion 33 that controls the entire device, a display control portion 34 that controls the display condition of the display portion 31, an SD card processing portion 35 that reads or writes data to the SD memory card 20, a communication control portion 36 that controls the data communication with the server 40, and a memory 37 that stores various programs including a content data delivery program and various data or the like.

The server 40 performs, in response to a data query request or a data transfer request from the store terminal 30, a variety of data processings such as searching a data related to the query request or transmitting a data related to the transfer request. As an example, the store terminal 30 sends a query request to the server 40 to determine whether the data already registered as a member includes the media identifier IDm of the SD memory card 20 in process. The server 40 is connected to a variety of databases, including a member-registration information database 41, a media identifier database 42, a handheld-device identifier database 43, a content database 44, a content-bibliography information database 45, a content key database 46, and a member content-key database 47.

The member-registration information database 41 holds the member-registration information of the user who applies for the use of the specific service provided by the content data delivery system of the present embodiment. Referring to FIG. 3, the member-registration information includes the member number of the user, the handheld-device identifier IDc, and the media identifier IDm of the SD memory card 20 used in the handheld device 10. Note that the member registration may be performed in any suitable manner such as by user's accessing the server 40 from the handheld device 10 via the mobile phone network, by using the store terminal 30, or by mail.

The media identifier database 42 holds the data of the media identifier IDm held by each SD memory card 20. The handheld-device identifier database 43 holds the data of the handheld-device identifier IDc. The content database 44 holds the content data after being encrypted with the corresponding content key data. The content database 44 holds the content data in such a way that the content data corresponds to the content ID or the like. The content-bibliography information database 45 holds the bibliography information (such as the title and artist name) of the content data. The content-bibliography information database 45 holds the bibliography information in such a way that the information corresponds to the content key data and content ID or the like. The content key database 46 holds various content key data with which the content data is encrypted. Referring to FIG. 4, the member content-key database 47 holds a bunch of the user's content key data. The member content-key database 47 holds the bunch of data in such a way that the bunch corresponds to the member number of the user, handheld-device identifier IDc, or media identifier IDm of the SD memory card 20 used in the handheld device 10. This database may be used, when the user registered as the member of the system of the present embodiment has accidentally deleted the content key data of the SD memory card 20, to redownload the content key data on the basis of the member registration data.

Figure 5:
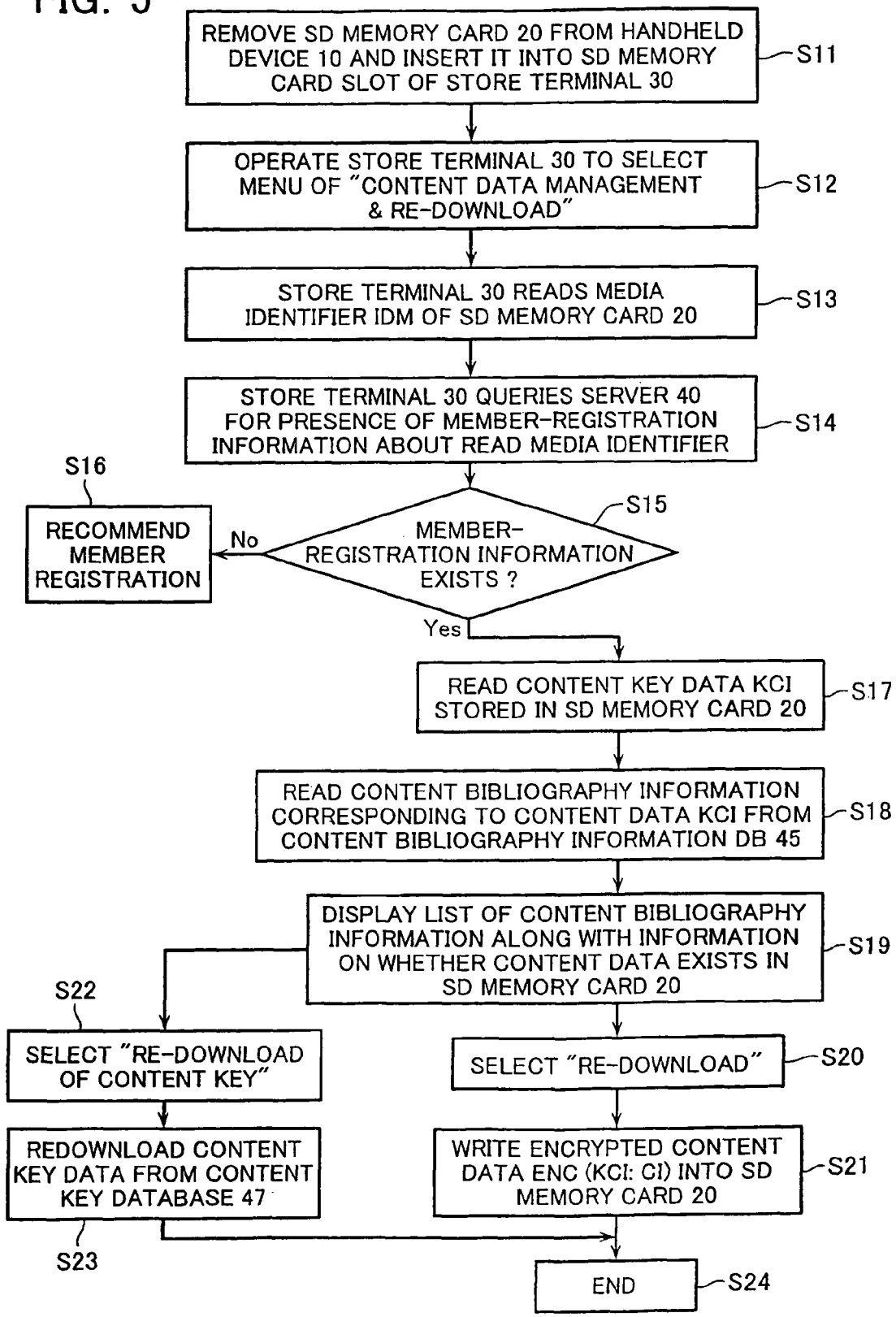
FIG. 5 is a flowchart of an operation procedure of the content data delivery system of an embodiment of the present invention.
Figure 6:
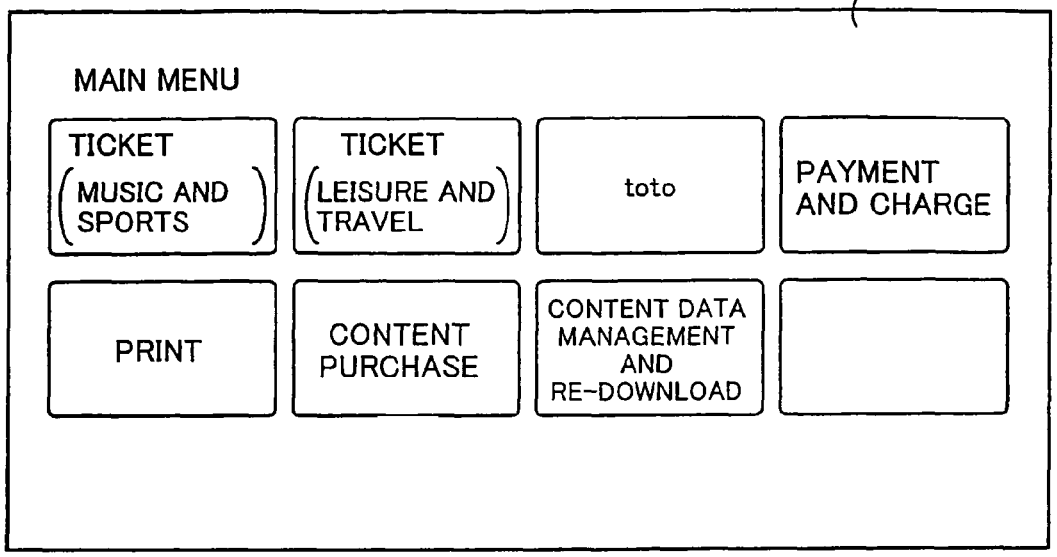
FIG. 6 is an example of a display of the display portion 31 of the store terminal 30.

Referring to the flowchart in FIG. 5, a description is now given of the procedure for using the content data delivery system of the present embodiment. First, the user removes the SD memory card 20 from the handheld device 10 and inserts the card into the slot 32 of the store terminal 30 (S11). The display portion 31 displays, for example, a main menu screen as shown in FIG. 6. The input device (such as the touch panel) of the store terminal 30 is used to select, for example, the menu of "CONTENT DATA MANAGEMENT AND RE-DOWNLOAD" (S12).

Figure 7:
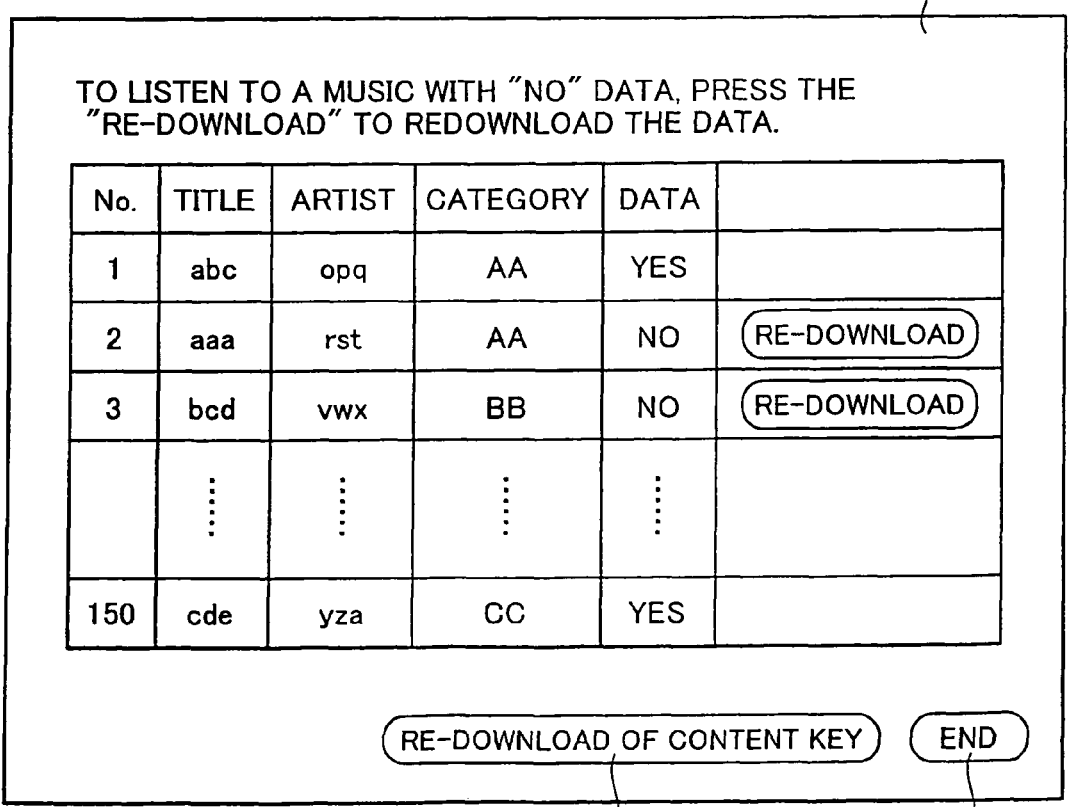
FIG. 7 is another example of a display of the display portion 31 of the store terminal 30.

The store terminal 30 then accesses the system area 21 of the SD memory card 20 inserted into the slot 32, thereby reading the media identifier IDm of the SD memory card 20 (S13). The store terminal 30 then queries the server 40 for the presence of the member-registration information about the read media identifier IDm (S14). The server 40 verifies the media identifier IDm included in the query request with the member-registration information database 41, and returns the store terminal 30 information on whether the corresponding member-registration information exists. If no corresponding member-registration information exists ("NO" in S15), then the store terminal 30 displays a message recommending the member-registration on the display portion 31 (S16). If the corresponding member-registration information exists, then the store terminal 30 accesses the user data area 24 of the SD memory card 20 and reads the content key data Kci stored in the SD memory card 20 (S17). The store terminal 30 then reads the content bibliography information corresponding to the content data Kci from the content-bibliography information database 45 (S18). The store terminal 30 then accesses the user data area 24 again to check whether the user data area 24 stores the encrypted content data Ci corresponding to the read content key data Kci. The store terminal 30 then displays on the display portion 31 the list of the content bibliography information along with information on whether the content data Ci exists in the SD memory card 20 (S19). FIG. 7 shows an example of the display on the display portion 31. The display portion 31 displays the bibliography items (such as the title, artist name, and category), which are read as the content bibliography information, along with information (data "Yes" or NO") on whether the content data Ci exists in the SD memory card 20. The user may see the screen to know what kind of content the content key data owned by the user relates to, or what content data the SD memory card 20 actually stores. The user may thus manage his or her own content data on the store terminals 30 existing all over the country, just like the user manages the own content data at home using his or her personal computer using a content data management software or the like.

Figure 8:
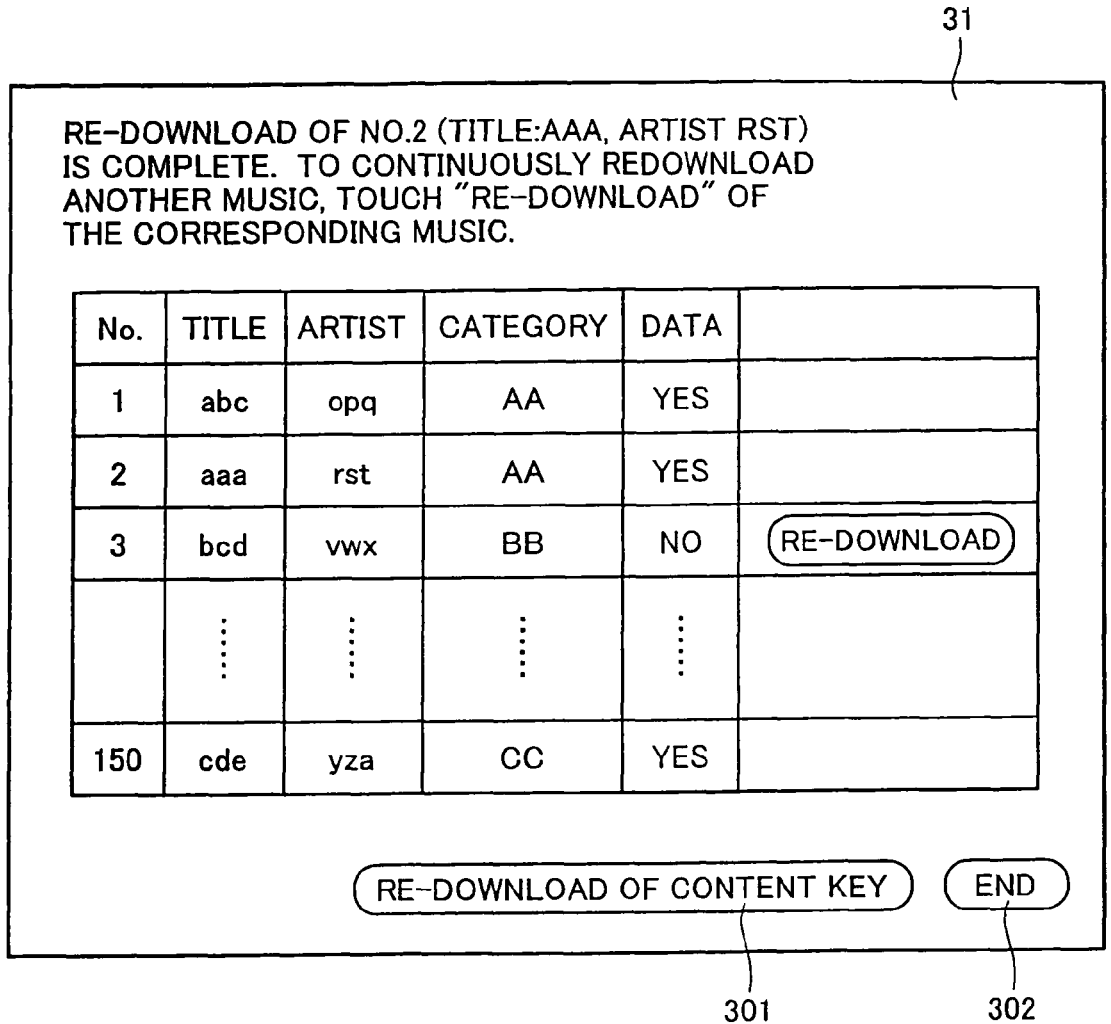
FIG. 8 is another example of a display of the display portion 31 of the store terminal 30.

The content data with "NO" displayed on the display portion 31 has an icon of "re-download" displayed next to the "NO."Selection of the "re-download" icon (S20) makes the store terminal 30 transfer the request to the server 40. In response, the server 40 transfers the content data Enc (Kci: Ci) encrypted with the content key data Kci to the store terminal 30. The store terminal 30 writes the encrypted content data Enc (Kci: Ci) into the user data area 24 of the SD memory card 20 (S21). The user may thus play and enjoy the content data Ci on the handheld device 10 or the like. After the writing is completed, the field of "DATA" corresponding to the content data Ci changes from "NO" to "YES," and the icon of "re-download" disappears, as shown in FIG. 8. To continuously redownload another content data, the procedure described above may be repeated. The re-download may be ended by selecting the "END" icon 302 in the lower right of the screen (S24).

In this way, the user may store in the SD memory card 20 a large number of content key data each having a small data volume, while the user may store in the SD memory card 20 only the portion of the large-volume content data that the user wants to play now. The user may exchange the content data by enjoying the service described above at the store with the store terminal 30 provided therein. The user may thus manage a large amount of content data only using the handheld device 10 without having a personal computer at home and may exchange the content data anywhere and any time. No security problems will arise because the service described above is only provided to the user that has been registered as a member using the handheld-device identifier and media identifier.

Note that selection of the icon 301 of "RE-DOWNLOAD OF CONTENT KEY" in the lower right of the screen in FIG. 7 (S22) may redownload the content key data from the content key database 47 (S23).

Figure 9:
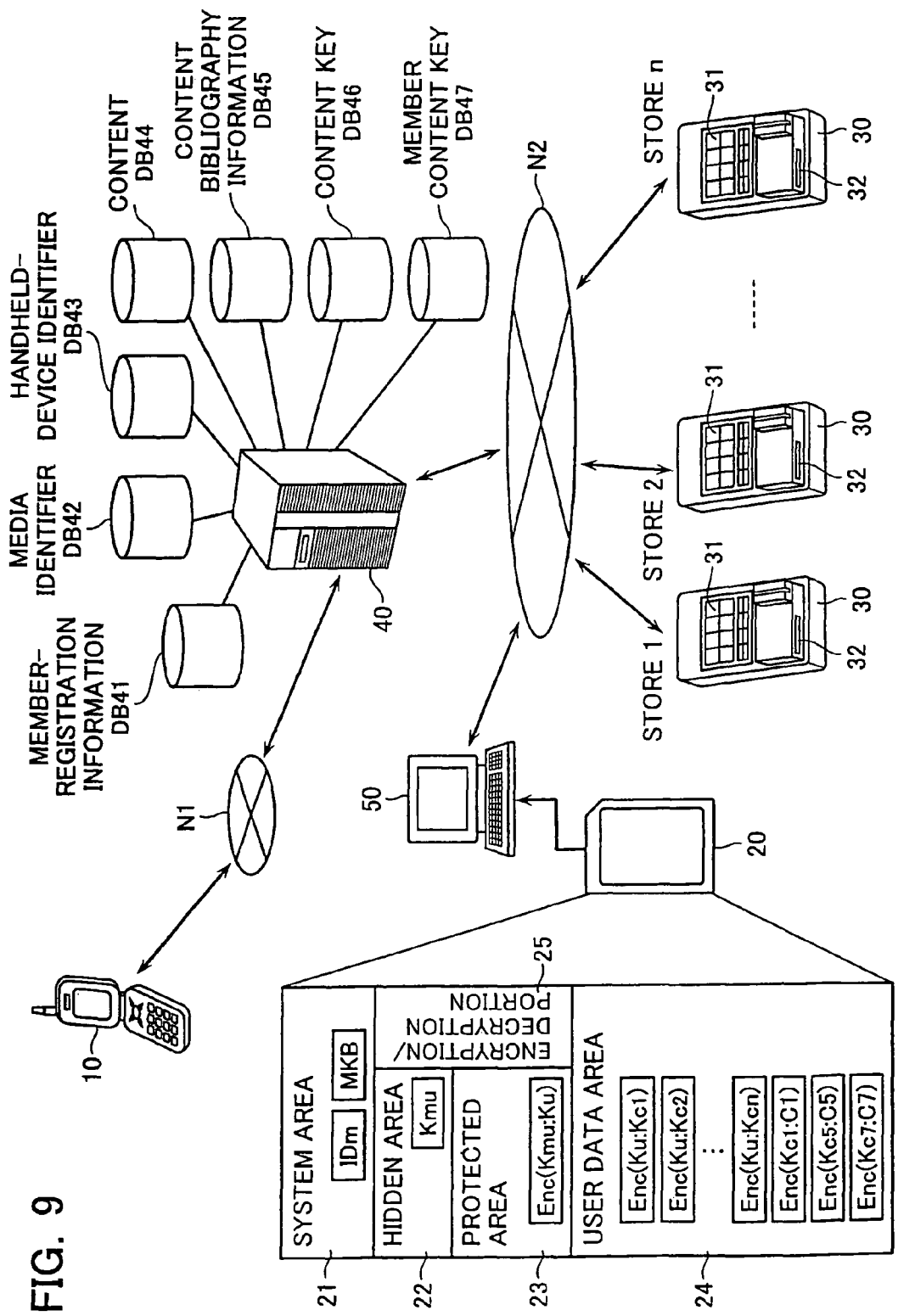
FIG. 9 is an example of a variant of an embodiment of the present invention.

While the invention has been described with reference to a particular embodiment thereof, it is not limited to the embodiment. It will be understood that various modifications, replacements, additions and the like may be made without departing from the sprit of the invention. Although, for example, the embodiment described above has shown only one server 40, there may be provided a plurality of distributed servers that are connected with each other. A portion of the content data, for example, the salable content data may be stored in the memory 37 by the store terminal 30 itself, and may be redownloaded without data communication. Each store terminal 30 may exchange data with each other. The server 40 may only perform, the above-described re-download (locker service) of the content data provided by a plurality of servers managed by a plurality of different content-data-delivery providers. Although the embodiment described above has described an example where various data are obtained from the store terminal 30, the data may be obtained, for example, as shown in FIG. 9, by using a personal computer 50 connected to the server 40 via the network N2 such as the internet, and by obtaining the same service via the World Wide Web (WWW) or the like as obtained from the store terminal 30. The personal computer 50 may belong to the user or to others such as in the Internet cafe.

Instead of or along with inserting the SD memory card 20 into the SD memory card slot 32, the handheld device 10 with the SD memory card 20 already inserted thereinto may be connected to the store terminal 30 via the USB cable or the like. In this case, instead of the SD memory card 20 storing the redownloaded content data, a different storage media stored in the mobile phone 10 may store the redownloaded content data. Further, the storage condition of the corresponding content data may be determined by searching and making determination on the relevant different storage media coupled to the SD memory card 20.

The member registration may be performed by registering a plurality of media identifiers of a plurality of SD memory cards for the handheld-device identifier of one handheld device 10. After the member registration is completed, additional registration of another card may be accepted. The fee after the member registration may be set in various ways, such as a fixed fee for any number of downloads, and a basic fee for a predetermined number of downloads and an additional fee proportional to the number of excess downloads.

Note that in the content data delivery system of the present embodiment, the new content data may be purchased by two methods: (1) transmitting directly to the store terminal 30 one that the user wants to purchase among the encrypted content data Enc (Kc: Ci) stored in the content database 44; and (2) storing in the content database 44 the raw content data Ci before encryption, and encrypting the content data Ci after reading the corresponding content key data Kci from the content key database 46, and transmitting the encrypted content data Ci to the store terminal 30.

What is claimed is:

1. A content data delivery system configured to deliver various data to a handheld device and to make content data available in said handheld device, said handheld device being configured to be connectable to a storage medium that holds a unique medium identifier, encrypted content data, and content key data used to decrypt the encrypted content data, said content data delivery system comprising:
   a server, communicating with the handheld device, comprising
   a member-registration information database that holds member-registration information including a data pair of a handheld-device identifier related to said handheld device and said medium identifier, and a content-key database that holds content-key data associated with said medium identifier;

a verification portion that, in response to receiving said medium identifier held by the storage medium verifies said medium identifier with said member-registration information database and, in response to receiving the content key read from the storage medium, verifies said content key data with said content-key database; and a transfer portion that transfers said encrypted content data to said storage medium if said storage medium does not contain said encrypted content data depending on specification by a user of said storage medium; and a handheld device connected to the storage medium, wherein the storage medium stores a medium identifier data, a user key data and encrypted content key data in which a content key data is encrypted using the user key data, the handheld device further including a storage condition determination portion that, when said verification portion determines that said medium identifier corresponds to said member-registration information, reads, via the handheld device, said content key data held in the storage medium, and determines, based on the read content key data, whether the encrypted content data corresponding to the read content key data is stored in said storage medium or not, wherein the handheld device accesses a user data area of said storage medium and reads the content key data, and wherein the handheld device accesses the user data area of said storage medium again to check whether the user data area stores the encrypted content data corresponding to the read content key data;

a display portion that displays a determination result of said storage condition determination portion to said user, wherein said result includes a listing of all content keys stored in said storage medium and an indication whether an encrypted content corresponding to each of said content keys exists in said storage medium or not; and a transfer portion that sends a request to transfer said encrypted content data corresponding to the read content key to the server and writes the encrypted content data into the user data area of the storage medium if the storage medium does not contain the encrypted content data, depending on specification by said user of said storage medium.

2. The content data delivery system of claim 1, wherein said content-key data is transferred to said storage medium in response to a request by the user.

3. A method for delivering data to a handheld device, said handheld device being configured to be connectable to a storage medium that holds a medium identifier unique to the storage medium, encrypted content data, and content key data used to decrypt the encrypted content data, said method comprising:

storing, in a database, member-registration information including a data pair of a handheld-device identifier related to the handheld device and the medium identifier, and storing, in a content-key database, content-key data associated with said medium identifier;

verifying that the medium identifier is stored in the database after reading the medium identifier of the storage medium;

in response to receiving said medium identifier held by the storage medium, verifying that the medium identifier is stored in the database, and in response to receiving the content key read from the storage medium, verifying said content key data with said content-key database;

determining, based on reading, via the handheld device, the content key data, whether encrypted content data corresponding to the content key data is stored in the storage medium or not, when the medium identifier is verified as being stored in the database, wherein the handheld device accesses a user data area of said storage medium and reads the content key data, and wherein the handheld device accesses the user data area of said storage medium again to check whether the user data area stores the encrypted content data corresponding to the read content key data;

displaying a determination result of said determining step to said user, wherein said result includes a listing of all content keys stored in said storage medium and an indication whether an encrypted content corresponding to each of said content keys exists in said storage medium or not and transferring the encrypted content data corresponding to the content key data to the storage medium, when the storage medium does not contain the encrypted content data, depending on specification by said user of said storage medium.

4. The content data delivery system of claim 1, wherein the content key data stored in the storage medium includes a plurality of content keys, each content key being used to decrypt respective encrypted content data.

* * * * *